2,889,292
Patented June 2, 1959

2,889,292

COMPOSITION CONTAINING AN ALKYD RESIN AND A POLYAMIDE RESIN DERIVED FROM POLYMERIC FAT ACIDS AND AN ALKYLENE POLYAMINE

Dwight E. Peerman, Minneapolis, Minn., assignor to General Mills, Inc., a corporation of Delaware No Drawing. Application December 22, 1954
Serial No. 477,115

6 Claims. (Cl. 260—22)

The present invention relates to a polyamide-polyester composition of a particular type. More particularly the invention relates to the reaction between unsaturated polyesters of the maleic acid-ethylene glycol type with polyamide resins containing active amine groups and being derived from polyalkylene polyamines and polymeric fat acids.

Unsaturated polyesters of this type are frequently used for their thermal-setting properties. For example, a polyester of this type may be sold in a solution of monomeric styrene. When it is desired to set the material into an insoluble and infusible polymer a catalyst such as benzoyl peroxide is added and the styrene and maleic unsaturation react to produce an insoluble, infusible residue. These materials are used widely for potting, casting and low-pressure laminating with glass fibers.

There have been certain disadvantages attendant the use of these unsaturated polyester compositions. In general the polyester resins are rather hard brittle materials which cannot be made flexible without sacrificing the structural properties of the cured thermal-set compositions. Moreover, in making fiber glass laminates with these polyester resins considerable difficulties are encountered since the polyester resins are notorious for their lack of "wetting" ability and adhesion.

By reacting polyesters with the polyamides herein described it is possible to plasticize and to toughen the polyesters without destroying their other valuable properties. At the same time the polyamides contribute excellent "wetting" properties toward glass fibers. Moreover, they have outstanding adhesive qualities toward their reinforcing medium.

It is, therefore, an object of the present invention to provide a novel polyamide-polyester composition containing polyamides having active amino groups and being derived from a polyalkylene polyamine and polymeric fat acids and an unsaturated polyester composition derived from an unsaturated polycarboxylic acid and a polyhydric alcohol.

The polyesters employed in the present invention are unsaturated polyesters derived from an unsaturated polycarboxylic acid in which non-benzenoid unsaturation exists adjacent to at least one of the carboxyl groups. The most common examples of unsaturated acids which may be used are maleic and fumaric acids. Other unsaturated acids which may also be used include citraconic, mesaconic, itaconic, aconitic and the like. Some of these acids are available in the form of anhydrides and in the preparation of the polyester the anhydride is preferred. If the anhydride is not available the polyester may be made from the free acid.

Sometimes it is desirable to use two or more anhydrides or acids together. For example, a mixture of maleic and phthalic anhydrides is commonly used. The present invention is applicable to all these polyesters as long as they are derived at least in part from a polybasic acid containing non-benzenoid unsaturation. A wide variety of polyhydric alcohols may be used in the preparation of the polyesters. The typical polyhydric alcohols include ethylene, propylene and butylene glycols, glycerol, pentaerythritol, 2,2,6,6,tetramethylolcyclohexanol and other aliphatic polyhydric alcohols. The polyesters are prepared in a manner well known to those skilled in the art and no purpose would be served by a detailed repetition of such method. Polyesters of this type are readily available commercially and these commercial materials may be used as shown in the examples.

These polyesters are commonly dispersed in styrene as a solvent because of their high molecular weight and viscosity. In the present invention it is possible to employ these polyesters in the styrene solvent if desired. It is also possible, however, to employ the unsaturated polyester by itself. The peroxide catalysts conventionally employed heretofore in connection with the polyester-styrene compositions may be used if desired. It is found, however, that the polyamide resin will react with the unsaturated polyester to render it insoluble and infusible. The peroxide catalyst may be used, however, and, if used, produces an exothermic reaction which proceeds to infusibility and insolubility in a very short period of time. The present invention, therefore, provides a further advantage in that it makes possible a control over the speed at which the reaction is conducted.

Polyamide resins employed in the present invention are those derived from polymeric fat acids and polyalkylene polyamines. The polymeric fat acids employed in preparing the polyamides are those resulting from the polymerization of drying or semi-drying oils, or the free acids or simple aliphatic alcohol esters of such acids. Simple drying or semi-drying oils include soybean, linseed, tung, perilla, oiticica, cottonseed, corn, tall, sunflower, safflower, dehydrated castor oil and the like. In the polymerization process for the preparation of the polymeric fat acids, the fatty acids with sufficient double bond functionality combine for the most part, probably by a Diels-Alder mechanism, to provide a mixture of dibasic and higher polymeric acids. The acids with insufficient functionality to react remain as monomers and may be wholly or partially removed, for example, by distillation. The residue after distillation consists of the desired polymeric acids, and this mixture is used for the preparation of the polyamide resin. In place of this method of polymerization, any other method of polymerization may be employed whether the resultant polymer possesses residual unsaturation or not. The term "polymeric fat acid" as used herein, is intended to include the polymerized mixture of acids obtained, which mixture usually contains a predominant portion of dimeric acids, a smaller quantity of trimeric and higher polymeric acids and some residual monomers.

These polymeric fat acids are reacted with a variety of polyalkylene polyamines for the production of the polyamide. Typical polyalkylene polyamines include diethylene triamine, triethylene tetramine, tetraethylene pentamine and the like. The amidification reaction may be carried out under the usual conditions employed for this purpose. Generally this involves reaction at around 200° C. for approximately 3 hours. The polyamide resins thus obtained have melt viscosities within the approximate range of 100–2,000 poises at 40° C., preferably from 200–1,000 poises. The polyamide must contain free amino groups to the extent that the polyamide has an amine number of at least 50 and preferably an amine number of from 75 to 250. The term amine number as used herein is defined as the number of milligrams of potassium hydroxide equivalent to the free amine groups in one gram of the polyamide resin. The free amine groups in the polyamide react with the unsaturation of the polyesters to tie the polyamides chemically to the polyesters and thus improve their properties in the manner described above.

*Example 1*

A polyamide resin derived from polymeric fat acids and triethylene tetramine (General Mills Polyamide Resin 115) having an amine number of 220 was blended with a maleic short oil alkyd (Rezyl 7315) at 60% solids. The mixture reacted readily and gelled after a few minutes at room temperature. When a portion of the unreacted solution was spread on a glass plate the film dried to a hard non-tacky state. In contrast a similar mixture of Polyamide 115 and a phthalic alkyd was cured for one hour at 120° C. in the form of a film. No reaction was apparent and the film remained tacky and soft. This indicates that the benzenoid unsaturation of the phthalic alkyd was not suitable for reaction with a polyamide resin. Similar results were obtained with the following short oil phthalic alkyds—Duraplex A-29, Duraplex ND 77B, and Glyptal 1247.

*Example 2*

A mixture was prepared from the maleic alkyd of Example 1, the Polyamide Resin 115 and styrene. A similar composition was prepared from the phthalic alkyd. The maleic alkyd composition formed a moderately hard film on glass while the phthalic alkyd composition formed a soft film on glass. When benzoyl peroxide was added to each of the systems the maleic alkyd composition became hard on glass and the phthalic alkyd composition remained soft.

*Example 3*

Polyamide Resin 115 was reacted with a commercial polyester of the maleic acid-ethylene glycol-styrene type. This composition contained the polyester in solution in monomeric styrene. The polyamide resin gelled the polyester without the addition of a peroxide catalyst. In another experiment the benzoyl peroxide was added to the extent of 2% based on the total polyester-styrene blend and a definitely exothermic reaction ensued and the composition rapidly became very hard and tough. Similar reactions occurred with other commercial polyesters of the same general type.

From the above description it is apparent that the polyamide resins of the type herein described effectively react with polyesters derived from unsaturated polycarboxylic acids to produce hard tough compositions. The compositions may be made in the presence of unsaturated hydrocarbons such as styrene and vinyl toluene and furthermore the composition with these unsaturated hydrocarbons may be cured with or without a peroxide catalyst. While certain specific alkyd resins and polyamide resins have been referred to in the examples other alkyds and polyamide resins of the type referred to herein may be substituted and the reaction carried out under similar conditions for the production of products having essentially the same properties.

The proportion of the polyamide resin to the polyester resin can be varied quite widely. Even minute quantities of the polyamide modify the polyester resin to some extent. Similarly, minute quantities of the polyester modify the characteristics of the polyamide resin. In general, however, most useful compositions fall within the range of from 10–90% of polyamide resin and from 10–90% of the polyester. It is apparent, therefore, that numerous variations may be made in the invention without departing from the spirit thereof.

Now, therefore, I claim:

1. A polyamide-polyester composition, the active reactants of which consist essentially of (a) an alkyd resin of a polycarboxylic acid selected from the group consisting of maleic, fumaric, citraconic, mesaconic, itaconic, and aconitic acids and (b) a polyamide derived from polymeric fat acids and an alkylene polyamine at reaction temperatures of approximately 200° C. for approximately three hours, the polyamide having a melt viscosity in the approximate range of 100 to 2000 poises at 40° C. and having an amine number of at least 50, said amine number being an expression of the number of milligrams of potassium hydroxide equivalent to the free amine groups in one gram of the polyamide.

2. A composition according to claim 1 in which the alkylene polyamine is triethylene tetramine.

3. A composition according to claim 1 in which the alkylene polyamine is diethylene triamine.

4. A composition according to claim 1 which also contains an unsaturated hydrocarbon selected from the group consisting of styrene and vinyl toluene.

5. A composition according to claim 4 in which there is present a peroxide catalyst.

6. The reaction product of the composition of claim 1 in which the free amine groups of the polyamide have at least partially reacted with the ethylenic unsaturation in the polycarboxylic acid portion of the alkyd resin.

References Cited in the file of this patent

UNITED STATES PATENTS

| | | |
|---|---|---|
| 2,255,313 | Ellis | Sept. 9, 1941 |
| 2,663,649 | Winkler | Dec. 22, 1953 |